Aug. 11, 1964  H. J. VAN DOORNE  3,144,110
CENTRIFUGAL CLUTCH WITH LEADING AND TRAILING SHOE
Filed June 11, 1962  4 Sheets-Sheet 1

INVENTOR

Hubertus J. Van Doorne by Wenderoth, Lind & Ponack

Attorneys

Aug. 11, 1964  H. J. VAN DOORNE  3,144,110
CENTRIFUGAL CLUTCH WITH LEADING AND TRAILING SHOE
Filed June 11, 1962  4 Sheets-Sheet 2

*INVENTOR*

Hubertus J. Van Doorne by Wenderoth, Lind & Ponack

*Attorneys*

Aug. 11, 1964     H. J. VAN DOORNE     3,144,110
CENTRIFUGAL CLUTCH WITH LEADING AND TRAILING SHOE
Filed June 11, 1962     4 Sheets-Sheet 3
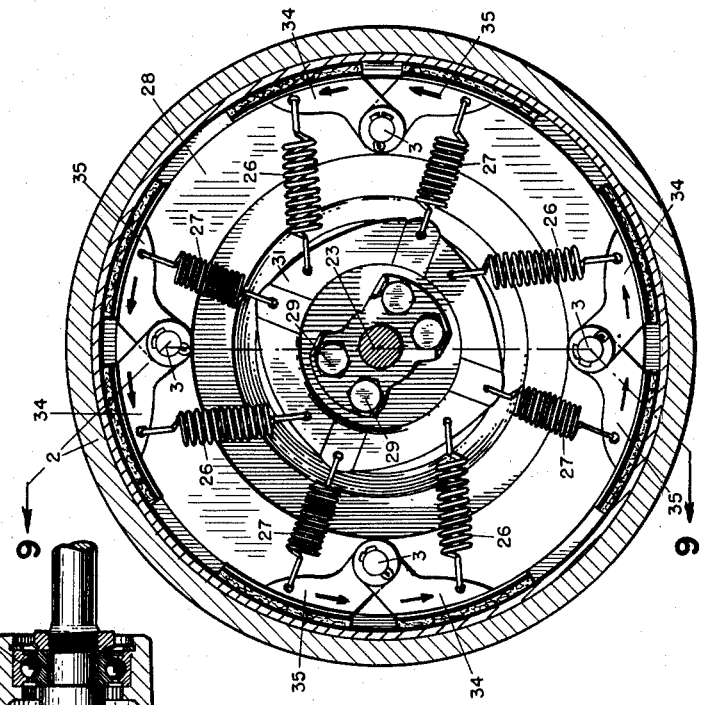
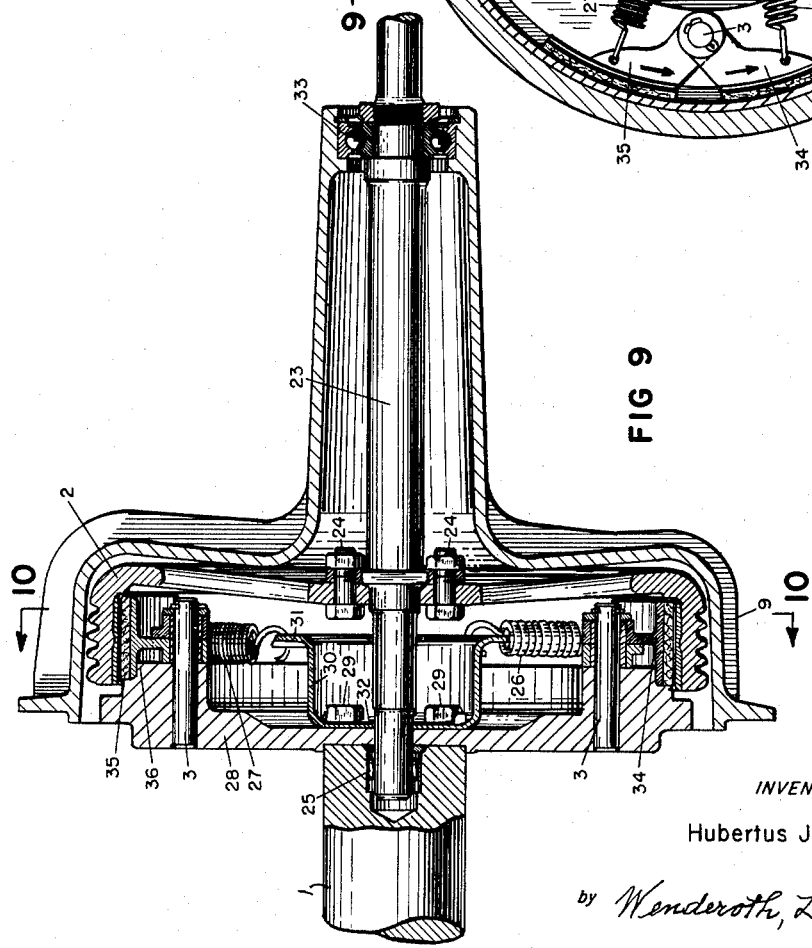
INVENTOR
Hubertus J. Van Doorne
by *Wenderoth, Lind & Ponack*
Attorneys Aug. 11, 1964     H. J. VAN DOORNE     3,144,110
CENTRIFUGAL CLUTCH WITH LEADING AND TRAILING SHOE
Filed June 11, 1962                                        4 Sheets-Sheet 4
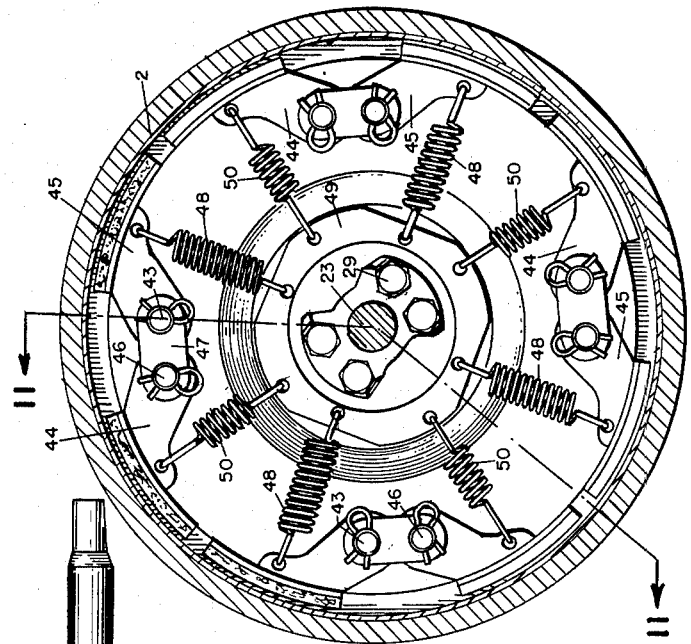
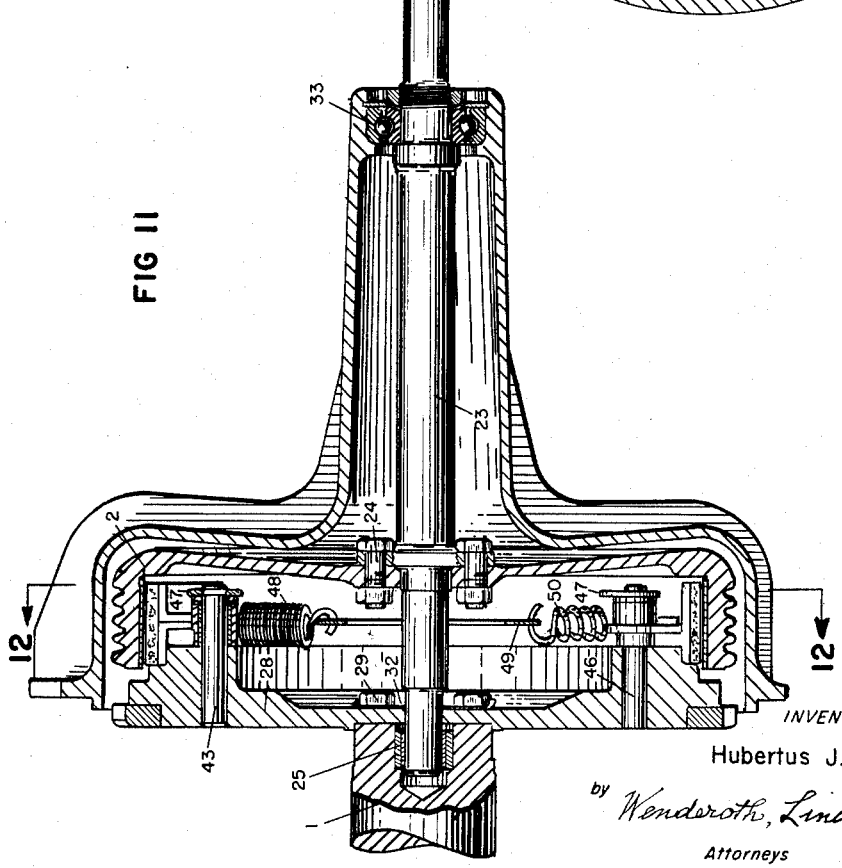
INVENTOR
Hubertus J. Van Doorne
by Wenderoth, Lind & Ponack
Attorneys United States Patent Office 3,144,110
Patented Aug. 11, 1964

3,144,110
CENTRIFUGAL CLUTCH WITH LEADING AND TRAILING SHOE
Hubertus Jesephus van Doorne, A54a Stationsstraat, Deurne, Netherlands
Filed June 11, 1962, Ser. No. 201,550
Claims priority, application Netherlands Jan. 21, 1959
1 Claim. (Cl. 192—105)

This application is a continuation-in-part of my application Serial No. 9,148, filed Jan. 18, 1960, now abandoned, entitled Centrifugal Clutch With Leading and Trailing Shoe.

The invention relates to an automatic clutch, particularly for motor vehicles, in which clutch shoes which are connected with the driving shaft, come into contact by centrifugal force against spring action with a clutch drum fixed to the driven shaft. By a clutch of this kind a torque is, starting from a certain speed, transmitted from the driving shaft to the shaft which is to be driven.

In order to elucidate the function of a such like centrifugal clutch and the object on which the invention is based, reference is made to FIG. 1 of the accompanying drawings in which the relation between the speed and the torque is represented by the curve 1.

It is supposed that up to 750 rev./min. no torque can be transmitted which is indicated in FIGURE 1 by the point $A_{1.2}$. For starting slowly on a flat road only a small torque is required, for instance, 30% of the maximum torque, which is transmitted at 1250 rev./min. as indicated by the point $B_1$. The maximum torque which is required for starting on a steep road, is transmitted at 2000 rev./min., vide point $C_1$.

A drawback of a clutch with a line of engagement 1 is that at a high altitude on which, in consequence of the lower density of the air, for instance not more than 60% of the maximum torque is available, the engagement takes place in the point $D_1$ where only 55% of the maximum torque can be transmitted. Consequently a loss of nearly 10% with respect to the torque which is already small at a high level, arises so that starting on a steep road, which is more difficult compared with a clutch controllable by the driver, becomes impossible at a high level.

The curves 2 and 3 represent two possibilities achievable with a normal centrifugal clutch in order to obtain an improvement in the critical situation mentioned above (steep road on high level).

The point $D_{2.3}$ lies now at 60% of the maximum torque and a more favorable result cannot be obtained. The point B shifts then to an undesirable speed $B_2$ or even to an inadmissible high speed $B_3$ at which the engagement takes place. Moreover, the result is that already at a relatively high speed the clutch disengages with the drawback of the inadmissible situation, respectively, that the minimum driving speed is relatively high. The point C is then also shifted to an unnecessary high speed $C_3$ or $C_2$, respectively.

The ideal line of engagement through the points $A_{1.2}$–$B_1$–$D_{2.3}$–$C_1$ is unattainable concerning the part $D_{2.3}$–$C_1$ since with a centrifugal clutch it is impossible to transmit an increasing torque at a decreasing speed.

The object of the invention is to approximate the ideal line of engagement by means of a centrifugal clutch which is as simple as possible and which functions entirely automatically under all conditions.

The object of the invention is to provide an automatic clutch in which the clutch shoes and the spring or springs acting thereon are so dimensioned that of a pair of clutch shoes one clutch shoe comes into contact with the drum at a lower number of revolutions than the other clutch shoe.

Another object of the invention is to provide an automatic clutch which is executed in such a way that the clutch shoe which engages the drum at a lower number of revolutions is not, and the other clutch shoe is energized by the relative movement of the clutch shoe with respect to the drum.

With the above and other objects in view which will become apparent from the detailed description below, some preferred embodiments of the invention are shown in the drawings in which:

FIGURE 9 is a cross-sectional view taken upon section line 9—9 of FIGURE 10 showing a further modification.

FIGURE 10 is a cross-sectional view with parts in elevation taken upon section line 10—10 of FIGURE 9.

FIGURE 11 is a cross-sectional view taken upon section line 11—11 of FIGURE 12 showing a still further modification, and FIGURE 12 is a cross-sectional view taken upon section line 12—12 of FIGURE 11.

Figure 2:
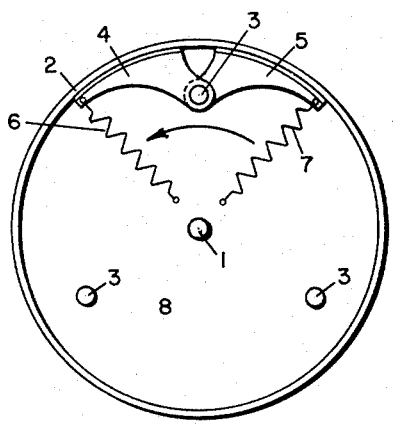
FIGURE 2 is a schematic view illustrating one form of the invention.

In FIGURE 2 only one pair of clutch shoes is shown, although in practice a larger number, for example three pairs of shoes are applied. In the modification shown in FIGURES 3, 5 and 6 only the trailing shoe is shown of each pair while the leading shoe is omitted.

In the embodiment according to FIGURE 2 the driving shaft is represented by 1 and the drum which is fixed to the driven shaft, is represented by 2. Of each pair of shoes two shoes 4 and 5 are mounted on a common pivot 3 and in the example shown there are three such pivots carried by a plate 8 which is fixed to the driving shaft 1. If the shaft 1 rotates the shoes 4 and 5 of each pair revolve about the axis of the shaft 1, so that all of the shoes are subjected to a centrifugal force. Said shoes are pulled inwardly by springs 6 and 7 attached to plate 8, respectively, hence against the centrifugal force acting on the shoes 4 and 5. Of these shoes, 4 is the energized or leading shoe and 5 is the non-energized or trailing shoe. The clutch shoes and the springs acting thereon are so dimensioned that if the shaft 1 turns in the direction of the arrow, and if the speed increases, the trailing shoe 5 which is not energized, comes first into contact with the drum 2, and only at a higher speed the leading shoe 4 engages the drum. This may be achieved by mutually determining in the right way:

(a) the weight of the leading and of the trailing shoe,
(b) the distance of the lines of action of the centrifugal force acting on the leading and on the trailing shoes with respect to the pivot 3, (c) the distance of the lines of action of the springs acting on the leading and on the trailing shoes with respect to the pivot 3, and (d) the strength of the springs 6 and 7 acting on the leading and on the trailing shoes, respectively.

Figure 1:
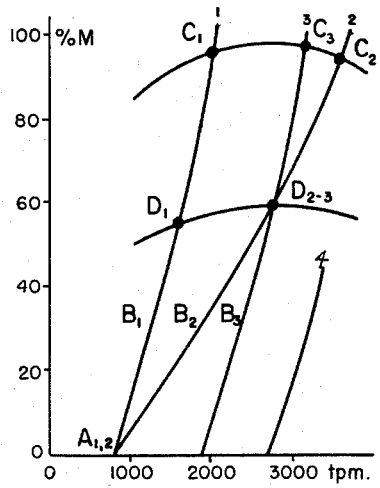
FIGURE 1 is a diagram showing the line of engagement resulting from the form of the invention shown in FIGURE 2.

The resulting line of engagement is represented in FIGURE 1 by $A_{1,2}$–$B_2$–$D_{2,3}$–$C_3$ and is composed of the line of engagement 2 of the trailing shoe and the line of engagement 4 of the leading shoe.

Figure 3:
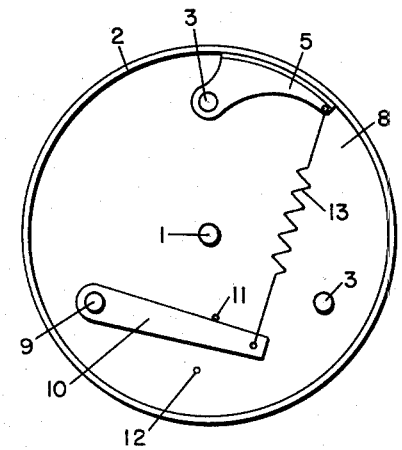
FIGURE 3 is a schematic view showing another form of the invention.

In the example according to FIGURE 3 the shoes, of which only the trailing shoe 5 is shown, are adapted to turn on the pivot 3. An arm 10 is adapted to turn about a pivot 9 which is connected with a plate 8 which is fixed to the shaft 1, and the amplitude of the movement of this arm is limited by abutments 11 and 12. The extremity of the arm 10 is connected with the shoe 5 by a spring 13. Preferably the pivot 9 serves at the same time as a pivot corresponding with the pivot 3 about which another pair of shoes are adapted to turn.

The parts are dimensioned in such a way that at a certain speed which is higher than the speed at which the shoe 5 engages the drum 2, the centrifugal force acting on the arm 10 increases the tension of the spring to such a degree that the torque which can be transmitted via the trailing shoe 5, begins to decrease again. At a higher speed the leading shoe can engage the drum through the trailing shoe either with a line of engagement as represented in FIGURE 1 by the curve 4, or it may be retracted in the same way as the trailing shoe by means of a spring, the tension of which is increased by the centrifugal force acting on the arm 10.

Figure 4:
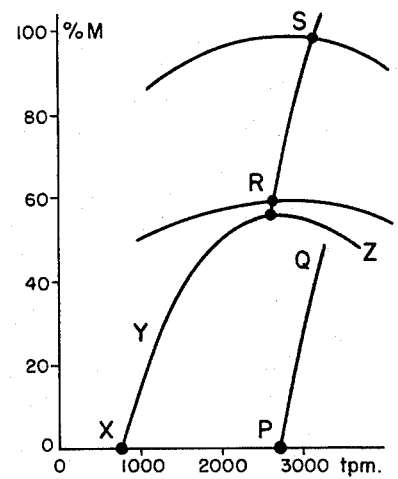
FIGURE 4 is a diagram illustrating the resulting line of engagement from the modification shown in FIGURE 3.

By mutually determining in the right way:
(a) the weights of the leading and the trailing shoes,
(b) the weight of the arm 10,
(c) the strength of the spring 13, and
(d) the distance of the line of action of the centrifugal force and of the spring with respect to the pivot 3, a line of engagement may be obtained as represented in FIGURE 4 by the line X–Y–R–S. This line is composed of the curve X–Y–Z of the trailing shoe and the line P–Q of the leading shoe. In this line the point X in FIGURE 4 corresponds with the point $A_{1,2}$ in FIGURE 1. The location of the point Y is even more favorable than the point $B_1$ in FIGURE 1. The point R coincides with the point $D_{2,3}$ and the point S coincides with the point $C_3$.

Figure 5:
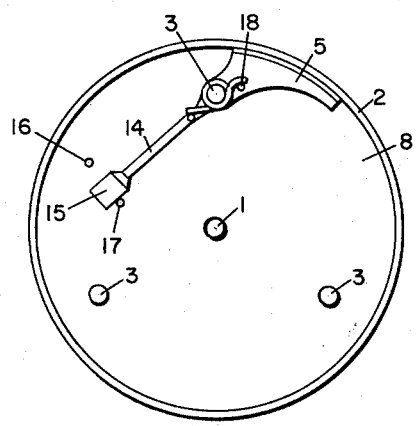
FIGURE 5 is a schematic view of another modification.

The embodiment according to FIGURE 5 is based on the same principle. The trailing shoe is adapted to turn on the pivot 3 and an arm 14 provided with a weight 15 at its extremity, is adapted to turn on the same pivot 3. The amplitude of the movements of the arm 14, 15 is limited by abutments 16 and 17 which are fixed to the disc 8. The shoe 5 is connected with the arm 14, 15 by means of a spring 18 which surrounds the pivot 3. This spring acts on the shoe 5 in such a way that it opposes the centrifugal force acting on that shoe. If the speed increases, the centrifugal force acting on the weight 15 moves the arm 14, 15 in the direction of the abutment 16, so that the force of the spring 18 is increased by the centrifugal action, like it is the case in the embodiment according to FIGURE 3 by the centrifugal force acting on the arm 10. By choosing the right dimensions of the parts, the line of engagement can be obtained as shown in FIGURE 4.

Figure 6:
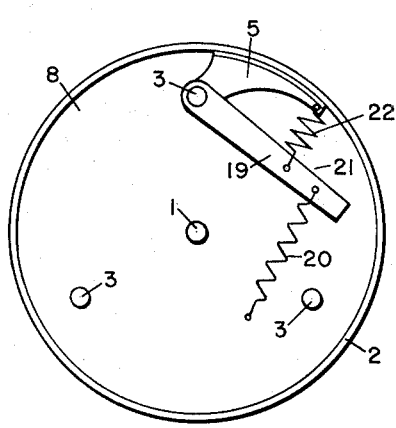
FIGURE 6 is a schematic view illustrating another form of the invention.

FIGURE 6 shows an embodiment in which (omitting again the leading shoe) the trailing shoe 5 is adapted to turn on the pivot 3. An arm 19 turns on this pivot, and a spring 20 which opposes the centrifugal force acting on the arm 19, is connected with the extremity of this arm. The outward movement of this arm 19 is limited by an abutment 21 fixed to the disc 8. A very strong spring 22 is arranged between the arm 19 and the shoe 5. The parts are so dimensioned that the shoe 5 engages the drum 2 before the arm 19 is stopped by the abutment 21.

Figure 7:
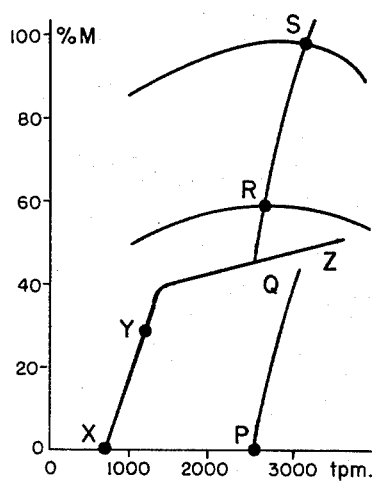
FIGURE 7 is a diagram showing the line of engagement by the modification of FIGURE 6.

By the embodiment according to FIGURE 6 a line of engagement is obtained which is represented in FIGURE 7. The line X–Y–Z is the line of engagement for the trailing shoe and the line P–Q for the normal leading shoe. The resulting line X–Y–R–S, is thus a line with a stepped shape.

Figure 8:
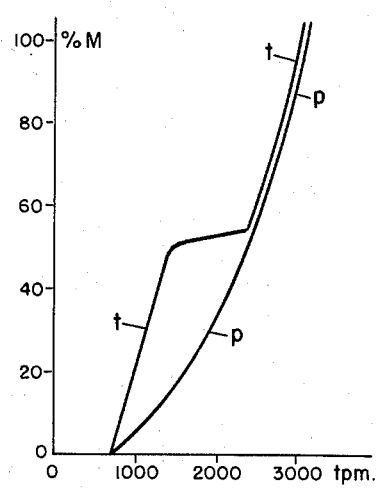
FIGURE 8 is a diagram illustrating two types of lines of engagement with one of said lines approaching the ideal line of engagement.

FIGURE 8 shows two types of lines of engagement, viz. the line $p$ with a flowing shape and the line $t$ with a stepped shape, the latter of said lines approaching the ideal line of engagement.

In FIGURES 9 and 10 a further modification is shown wherein the driving shaft is shown at 1 and the drum 2 is connected to the driven shaft 23 by means of the bolts 24. The plate 28 is fixed to the driving shaft by means of the bolts 29 which also secure a cup-shaped disc 30 having a flange 31 to which one end of the springs 26 and 27 are secured as shown particularly in FIGURE 9. The heads of the bolts 29 are locked in position by a locking plate 32 having portions thereof bent against the sides of the bolt heads after the bolts have been screwed into place.

The leading shoes are shown at 34 and the trailing shoes at 35. The shoes are pivoted upon the pins 3. The outer ends of the spring 27 are secured to the trailing shoes while the outer ends of the springs 26 are secured to the leading shoes. The plate 28 has the pivots 3 seated therein and is also provided with an abutment 36 which limits the movement of the shoes away from the drum 2. In this modification the lines of the action of the springs 27 pass through the axis of the driving shaft 1 while the lines of action of the springs 26 do not. In FIGURES 11 and 12 a further modification is shown wherein the construction is similar to that shown in FIGURES 9 and 10 except that an individual pivot 43 is provided for each trailing shoe 45 and an individual pivot 46 is provided for each leading shoe 44. A plate 47 connects the two outer ends of the pivots 43 and 46. The springs 48 are connected to the trailing shoes 45 at their outer ends and at their inner ends are connected to a floating ring 49. The springs 50 are connected at their outer ends to the leading shoes and at their inner ends to the floating ring 49. The ring 49 encircles the driven shaft 23 by the drum 2 and the plate 28. The driven shaft 23 is mounted in roller bearings at 25 within a recess provided in the driving shaft and at its other end by the ball bearings 33. In this construction the springs 48 and 50 are of different strength in order to secure the proper and desired action of the leading and trailing shoes with the drum 2.

As to the operation of all of the forms shown the trailing shoes engage the drum at a lower speed than the leading shoes which provides the advantage of a smooth primary engagement of the clutch and the securing of a positive engagement.

Up to a speed of 750 revs./min. both shoes remain in a retracted position so that no torque is transmitted. By increasing the speed of the engine the trailing shoe comes into contact with the drum 2. At an engine speed of about 2700 revs./min. the leading shoe comes into contact with the drum. The trailing shoe is not energized, whereas the leading shoe is energized by the relative rotation between the shoe and the drum.

The result is that at a high level, where the density of the air is low and consequently the engine sucks less oxygen, there is yet a sufficient torque available.

It follows from the above that by the invention a centrifugal clutch is achieved which, when applied to a motor vehicle, operates entirely automatically and which fulfills the requirements mentioned in the beginning of this description.

I claim:

An automatic clutch comprising a driving shaft, a plate secured to said driving shaft, a plurality of pivots secured to said plate, a leading clutch shoe and a trailing clutch shoe pivoted on said pivots, a driven shaft, a drum mounted on said driven shaft to be driven by said driving shaft, a plurality of springs each having one end connected to a clutch shoe to retract it away from said drum against centrifugal force acting on said clutch shoe when said driving shaft is rotated, said springs connected to said leading clutch shoes applying a force different from the force applied by said springs connected to said trailing clutch shoes, and a floating member located about said driven shaft to which the other ends of said springs are connected so that first said trailing shoes engage said drum at a predetermined speed of said driving shaft and then said leading shoes at a greater speed of said driving shaft.

References Cited in the file of this patent

UNITED STATES PATENTS

| | | |
|---|---|---|
| 846,193 | Fellows | Mar. 5, 1907 |
| 1,819,829 | Wersall | Aug. 18, 1931 |
| 2,471,747 | Hinden et al. | May 31, 1949 |

FOREIGN PATENTS

| | | |
|---|---|---|
| 607,169 | France | Mar. 23, 1926 |
| 1,116,829 | France | Feb. 13, 1956 |
| 748,028 | Germany | Oct. 25, 1944 |